US012614401B2

(12) United States Patent
Im et al.

(10) Patent No.: US 12,614,401 B2
(45) Date of Patent: Apr. 28, 2026

(54) APPARATUS AND METHOD FOR GENERATING TEXT FROM IMAGE AND METHOD OF TRAINING MODEL FOR GENERATING TEXT FROM IMAGE

(71) Applicant: Electronics and Telecommunications Research Institute, Daejeon (KR)

(72) Inventors: Dong Hyuck Im, Daejeon (KR); Jung Hyun Kim, Daejeon (KR); Hye Mi Kim, Daejeon (KR); Jee Hyun Park, Daejeon (KR); Yong Seok Seo, Daejeon (KR); Won Young Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 289 days.

(21) Appl. No.: 18/499,717

(22) Filed: Nov. 1, 2023

(65) Prior Publication Data

US 2024/0177507 A1 May 30, 2024

(30) Foreign Application Priority Data

Nov. 24, 2022 (KR) ........................ 10-2022-0158863

(51) Int. Cl.
| | |
|---|---|
| *G06V 20/70* | (2022.01) |
| *G06F 40/40* | (2020.01) |
| *G06T 11/00* | (2006.01) |
| *G06V 10/774* | (2022.01) |
| *G06V 10/82* | (2022.01) |

(52) U.S. Cl.
CPC .............. *G06V 20/70* (2022.01); *G06F 40/40* (2020.01); *G06T 11/00* (2013.01); *G06V 10/774* (2022.01); *G06V 10/82* (2022.01)

(58) Field of Classification Search
CPC ...... G06V 20/70; G06V 10/774; G06V 10/82; G06V 10/467; G06F 40/40; G06F 40/56; G06F 40/58; G06T 11/00; G06T 11/60
USPC ........................................................ 382/155
See application file for complete search history.

(56) References Cited

U.S. PATENT DOCUMENTS

| | | | |
|---|---|---|---|
| 9,298,682 | B2 | 3/2016 | Makadia et al. |
| 9,858,524 | B2 | 1/2018 | Bengio et al. |
| 10,949,744 | B2 | 3/2021 | Lin et al. |
| 11,195,048 | B2 | 12/2021 | Bui et al. |
| 11,281,709 | B2 | 3/2022 | Zheng et al. |
| 2022/0188703 | A1 | 6/2022 | Hong et al. |

(Continued)

FOREIGN PATENT DOCUMENTS

| | | | |
|---|---|---|---|
| CN | 101620615 A | * | 1/2010 |
| KR | 10-2021-0130980 | | 11/2021 |

(Continued)

*Primary Examiner* — Charlotte M Baker

(74) *Attorney, Agent, or Firm* — KILE PARK REED & HOUTTEMAN PLLC

(57) ABSTRACT

An apparatus for generating text from an image may comprise: a memory configured to store at least one instruction; and a processor configured to execute the at least one instruction, wherein the processor is further configured to generate encoding information for an image based on the image and extract text information related to content of the image based on a degree of association with the encoding information.

20 Claims, 6 Drawing Sheets

She is wearing lipstick and has brown hair

This woman has brown hair and wears lipstick, She is young and attractive

He has big lips, pointy nose and straight hair.

He is attractive and young.

(56)                   References Cited

U.S. PATENT DOCUMENTS

| 2023/0206661 | A1 | 6/2023 | Choi et al. | |
| 2024/0087083 | A1* | 3/2024 | Wang | G06T 9/002 |
| 2024/0127005 | A1* | 4/2024 | Panda | G06F 40/58 |

FOREIGN PATENT DOCUMENTS

| KR | 10-2022-0082618 | 6/2022 |
| KR | 10-2022-0098956 | 7/2022 |

* cited by examiner

FIG. 3

```
<|startofimg|> [TEXT DESCRIBING IMAGE]
<|img|> [CONSECUTIVE IMAGE TOKENS]
<|endofimg|>
```

She is wearing lipstick
and has brown hair

This woman has
brown hair and wears
lipstick, She is young
and attractive

He has big lips, pointy
nose and straight hair.

He is attractive and
young.

<|startofimg|>This woman is young, and smiling and has high cheektones, straight hair, brown hair, oval face, mouth slightly openm arched eyebrows, and narrow eyes.
<|img|>2412 14655 2795 15625 15625 11663 1688 9415 7073 10268 2990 10268 2795 2795 2795
7754 3492 15615 9375 7130 15615 16270 6085 53 8283 16028 4975 26 9375 15400 8

.
.
.

4129 8697 6726 15627 3859 1323 1247 5137 1556 8363 2613 15627 16257 5831 8948
13817 11262 4378 8762 14749 238 12589 10032 454 16028 1870 9310 10286 2066 1870 5166 18
70 9470 5949 11262 10286 11543 15627 3742<|endofimg|>

FIG. 8

The person has wavy hair. She is young.
She is wearing lipstick.

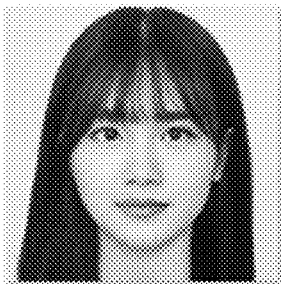
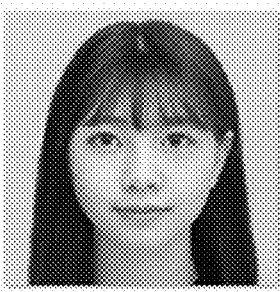
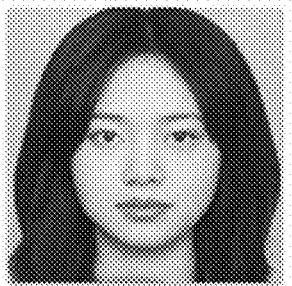

000209_The person has
wavy hair. She is young.
She is wearing
lipstick.png

000210_The person has
wavy hair. She is young.
She is wearing
lipstick.png

000211_The person has
wavy hair. She is young.
She is wearing
lipstick.png

She is wearing lipstick, and heavy makeup. She is
attractive and has pale skin, and arched eyebrows.

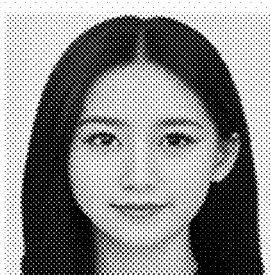
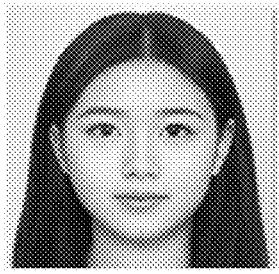
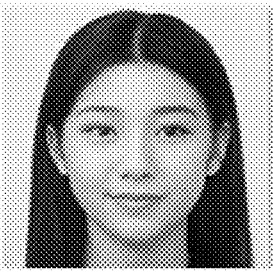

000069_She is wearing
lipstick, and heavy makeup.
She is attractive and has
pale skin, and arched
eyebrows.png 000070_She is wearing
lipstick, and heavy makeup.
She is attractive and has
pale skin, and arched
eyebrows.png 000071_She is wearing
lipstick, and heavy makeup.
She is attractive and has
pale skin, and arched
eyebrows.png

FIG. 9

APPARATUS AND METHOD FOR GENERATING TEXT FROM IMAGE AND METHOD OF TRAINING MODEL FOR GENERATING TEXT FROM IMAGE

CROSS-REFERENCE TO RELATED APPLICATIONS

This application claims priority to Korean Patent Application No. 10-2022-0158863, filed on Nov. 24, 2022, with the Korean Intellectual Property Office (KIPO), the entire contents of which are hereby incorporated by reference.

BACKGROUND

1. Technical Field

Example embodiments of the present disclosure relate in general to a technology for extracting text from an image including no text and/or an image without a related label based on the content of the image and an application technology for using text extracted from an image.

2. Related Art

Description here merely provides background information of the present disclosure and does not constitute prior art.

With the technological development of artificial neural networks, such as a deep neural network (DNN), a convolutional neural network (CNN), and the like, an image processing technology is rapidly developing.

An optical character recognition (OCR) technology for recognizing and extracting text from an image has rapidly developed with the application of artificial neural networks, and further, a technology for translating non-text content in an image into text is also developing with the development of artificial neural networks.

A technology for generating a natural language expression/sentence that describes an image given by a user is referred to as image captioning.

As disclosed in U.S. Pat. No. 9,298,682, automatic caption generation technologies before the advent of artificial neural networks mainly involved searching an image database with labels for a similar image to an input image and estimating a label of a similar image as a caption of the input image.

Meanwhile, Korean Patent Application No. 10-2021-0130980 "Apparatus and Method for Automatically Generating Domain Specific Image Caption Using Semantic Ontology" discloses a technology for extracting object area information of an image by recognizing objects in the image, converting the object area information into vector expressions, and calculating attention scores between the vectors and natural language expressions to generate a domain-specific image caption. However, even according to the related art, a training process for generating the natural language description of an image requires a huge amount of memory and calculation, and training is possible for limited domains only.

SUMMARY

Accordingly, example embodiments of the present disclosure are provided to substantially obviate one or more problems due to limitations and disadvantages of the related art.

Example embodiments of the present disclosure provide an apparatus and method for generating natural language text describing an image based on image-only data without any label.

Example embodiments of the present disclosure also provide a technique for reducing the load of a process of generating natural language text describing an image.

Example embodiments of the present disclosure also provide a technique for generating natural language text describing not only objects which are detectable in an image but also the image itself.

Example embodiments of the present disclosure also provide a technique for reducing a training time of a model for generating natural language text describing an image.

According to a first exemplary embodiment of the present disclosure, an apparatus for generating text from an image may comprise: a memory configured to store at least one instruction; and a processor configured to execute the at least one instruction, wherein the processor, by the at least one instruction, is further configured to generate encoding information for an image based on the image and extract text information related to content of the image based on a degree of association with the encoding information.

The processor may extract the text information by translating the encoding information into text.

The processor may extract, as the text information, text having high attention with the encoding information as the degree of association with the encoding information.

The processor may generate the encoding information using a codebook for encoding the image.

The processor may generate the encoding information by converting the image into an image token sequence.

The processor may generate image-text synthetic data for the image by combining the image and the text information.

The processor may generate an image based on the text using the image-text synthetic data.

According to a second exemplary embodiment of the present disclosure, a method of generating text from an image, which is performed by a processor configured to execute at least one instruction stored in a memory when the processor executes the at least one instruction, may comprise: generating encoding information for an image based on the image; and extracting text information related to content of the image based on a degree of association with the encoding information.

In the extracting of the text information, the encoding information may be translated into text so that the text information is extracted.

In the extracting of the text information, text having high attention with the encoding information as the degree of association with the encoding information may be extracted as the text information.

In the generating of the encoding information, the encoding information may be generated using a codebook for encoding the image.

In the generating of the encoding information, the image may be converted into an image token sequence so that the encoding information is generated.

The method may further comprise combining the image and the text information to generate image-text synthetic data for the image.

The method may further comprise generating an image based on the text using the image-text synthetic data.

According to a third exemplary embodiment of the present disclosure, a method of training a model for generating text from an image, which is performed by a processor configured to execute at least one instruction stored in a memory when the processor executes the at least one instruction, may comprise: generating encoding information for an image based on the image; and controlling an image-text translation model to learn a function of extracting text information related to content of the image based on a degree of association with the encoding information.

In the learning by the image-text translation model, the image-text translation model may learn a function of extracting, as the text information, text having high attention with the encoding information as the degree of association with the encoding information.

The method may further comprise: inputting a training image to an encoder-decoder model; and controlling the encoder-decoder model so that the encoder-decoder model learns a function of generating an image codebook from the training image.

In the generating of the encoding information, the image may be converted into an image token sequence using the image codebook so that the encoding information is generated.

The method may further comprise combining the image and the text information to generate image-text synthetic data for the image.

The method may further comprise controlling a text-based image generation model so that the text-based image generation model learns a function of generating an image based on the text using the image-text synthetic data.

According to example embodiments of the present disclosure, it is possible to implement an apparatus and method for generating natural language text describing an image based on image-only data without any label.

BRIEF DESCRIPTION OF DRAWINGS

FIG. 3 is a conceptual diagram illustrating an image codebook learning process according to an exemplary embodiment of the present disclosure.

FIG. 8 shows a set of images generated from text as application examples of a process of generating text from an image according to an example embodiment of the present disclosure.

FIG. 9 is a block diagram showing an example of a generalized dynamic workload processing device, dynamic workload processing system, or computing system for performing at least some of the processes of FIGS. 1 to 8.

DETAILED DESCRIPTION OF THE EMBODIMENTS

Figure 1:
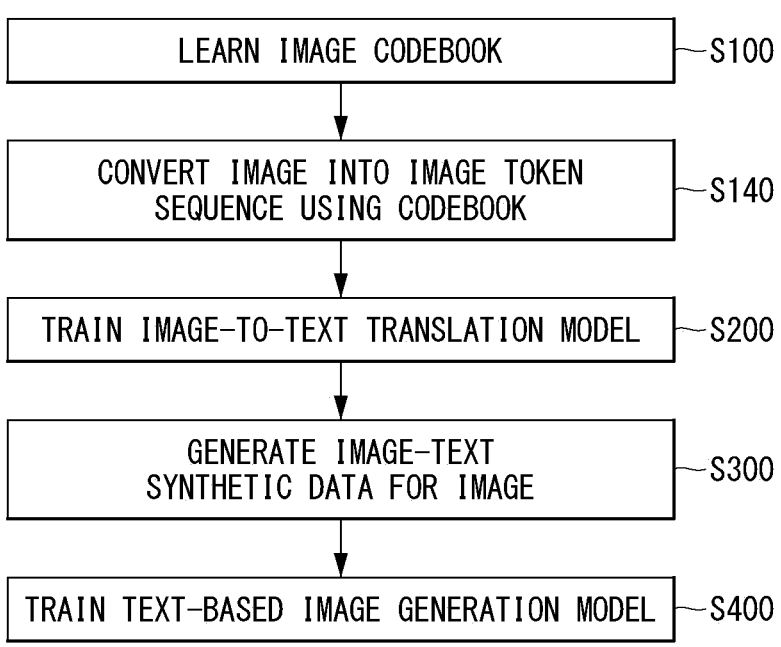
FIG. 1 is an operational flowchart illustrating a method of training a model for generating text from an image according to an example embodiment of the present disclosure and a preparation process and an application example of the method.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, even a technology known before the filing date of the present application may be included as a part of the configuration of the present disclosure when necessary, and will be described herein without obscuring the spirit of the present disclosure. However, in describing the configuration of the present disclosure, the detailed description of a technology known before the filing date of the present application that those of ordinary skill in the art can clearly understand may obscure the spirit of the present disclosure, and thus a detailed description of the related art will be omitted.

For example, a technique of compressing and restoring an image using a convolutional neural network (CNN) encoder-decoder model, a technique of extracting attention for natural language translation using a transformer neural network, a technique of generating image-text pair data by combining an image and text, and the like may employ related technologies known before application of the present disclosure, and at least some of the related technologies may be applied as element technologies required for implementing the present disclosure.

However, the present disclosure is not intended to claim the rights to these related technologies, and the content of the related technologies may be included as part of the present disclosure without departing from the spirit of the present disclosure.

Hereinafter, example embodiments of the present disclosure will be described in detail with reference to the accompanying drawings. In describing the present disclosure, to facilitate overall understanding, like reference numerals will be used for like components, and description of the same components will not be reiterated.

FIG. 1 is an operational flowchart illustrating a method of training a model for generating text from an image according to an example embodiment of the present disclosure and a preparation process and an application example of the method.

The method of training an image-to-text translation model for generating text from an image according to an example embodiment of the present disclosure may be implemented when a processor for executing at least one command stored in a memory executes at least one command.

The training method of the present disclosure includes an operation S140 of generating encoding information for an image based on the image and an operation S200 of controlling an image-to-text translation model so that the image-to-text translation model learns a function of extracting text related to the content of an image based on the degree of association with encoding information.

In the operation S200 in which the image-to-text translation model learns the function, the image-to-text translation model may learn a function of extracting, as text information, text having high attention with encoding information as the degree of association with encoding information.

The method of training a model for generating text from an image according to an example embodiment of the present disclosure may further include an operation of inputting a training image to an encoder-decoder model and an operation S100 of controlling the encoder-decoder model so that the encoder-decoder model learns a function of generating an image codebook from the training image.

In the operation S140 of generating encoding information, the image may be converted into an image token sequence using the image codebook so that encoding information may be generated.

The method of training a model for generating text from an image according to an example embodiment of the present disclosure may further include an operation S300 of generating image-text synthetic data for the image by combining image and text information.

The method of training a model for generating text from an image according to an example embodiment of the present disclosure may further include an operation S400 of controlling a text-based image generation model so that the text-based image generation model learns a function of generating an image based on text using image-text synthetic data.

The present disclosure aims at generating text/image synthetic data so that a text-based image may be generated from an image-only dataset which has only images without text information, and may be configured overall as shown in the flowchart of FIG. 1.

In operation S100, the codebook for representing an image is learned. An image may be represented as codebook indices in block units rather than pixel units through the codebook. A text/image-pair dataset belonging to the same domain as the image-only dataset is prepared and converted into an image token sequence using the image codebook (S140). Such a codebook and/or image token sequence may be interpreted as compressed information of an image and will be referred to as "encoding information" in this specification for convenience of description.

After operation S140, text/image token sequence pair data may be generated based on the image. The image-to-text translation model may be trained using the text/image token sequence pair data (S200). When the case of generating an image from text is generally expressed as forward translation, the image-to-text translation model assumed in an example embodiment of the present disclosure may be construed as a back-translation model.

When an image token sequence is input to an image-to-text back-translation model according to an example embodiment of the present disclosure, the image-to-text back-translation model may output text information of the image. This process corresponds to operation S240 of FIG. 2 to be described below.

Virtual synthetic data which describes the image may be generated for the image-only dataset without text information using the back-translation model (S300). The text-based image generation model may be trained using virtual text/image pair data generated as described above (S400). According to the present disclosure, an image related to text can be generated from the text due to learning based on an image-only dataset which has only images without descriptive information of the images.

For example, a case of generating a desired Korean face image from a text input is assumed. To this end, a Korean face image dataset may be collected from a web or a social network service (SNS). However, it is difficult to collect text data describing Korean face images. In other words, the collected Korean face image dataset is an image-only dataset (dataset without label and/or description).

A text/image pair dataset belonging to a similar domain to that of an image to be generated or learned may be searched for and used. For example, the Multi-Modal CelebA-HQ dataset is an open dataset and provides text information of CelebA-HQ which is a dataset of 30,000 face images of celebrities.

The back-translation model is generated using text/image pair data, and virtual text data describing Korean face images may be generated by the model from a Korean face image dataset (S300). A text-based Korean face image generation model may be trained using text/image synthetic data generated as described above (S400).

To train a machine translation model for translating a language into another language, a massive parallel dataset in which source language data is paired with corresponding target language data is necessary. When there is only a target language dataset, a source language dataset may be generated using a back-translation technique and used for training the machine translation model. According to the back-translation technique, a single language corpus may be translated through a trained existing backward translator to generate a synthetic parallel corpus, and then the synthetic parallel corpus is added to an existing bidirectional parallel corpus and used for training.

When the image is encoded using the codebook, the image is converted into an image token sequence, and the converted image token sequence may be considered one sentence. In this view, a mechanism of generating text from an image may be considered the same as a machine translation mechanism. When a sentence in which text is encoded into a source language and an image is encoded using a codebook is considered in a target language, the sentence may be considered to have a massive target language dataset and a small parallel dataset in operations subsequent to operation S140.

In the subsequent operations, a method of generating a source language (text) corresponding to the target language (image) using the back-translation technique may be used.

Figure 2:
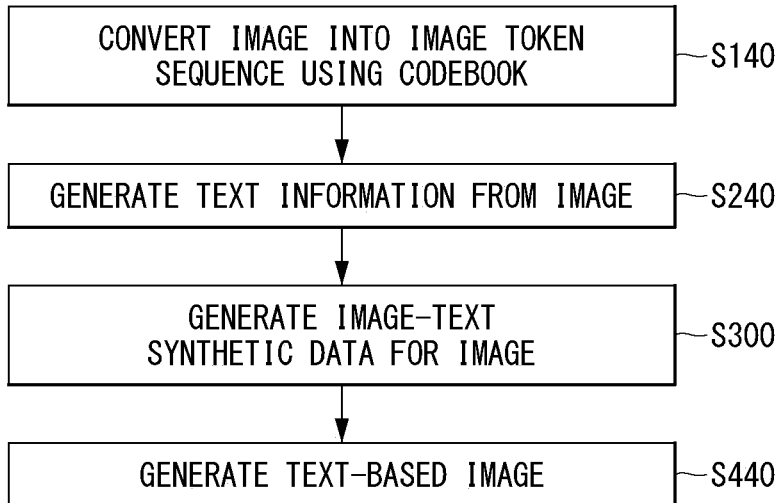
FIG. 2 is an operational flowchart illustrating a method of generating text from an image according to an example embodiment of the present disclosure and a preparation process and an application example of the method.

FIG. 2 is an operational flowchart illustrating a method of generating text from an image according to an example embodiment of the present disclosure and a preparation process and an application example of the method.

The method of generating text from an image according to an example embodiment of the present disclosure may be implemented when a processor for executing at least one command stored in a memory executes at least one command. The method of the present disclosure includes an operation S140 of generating encoding information for an image based on the image and an operation S240 of extracting or generating text information related to the content of the image based on the degree of association with the encoding information.

In operation S240 of extracting or generating text information, the encoding information may be translated into text so that text information may be extracted or generated.

In operation S240 of extracting or generating text information, text having high attention with the encoding information as the degree of association with the encoding information may be extracted or generated as text information.

In operation S140 of generating encoding information, encoding information may be generated using a codebook for encoding an image.

In operation S140 of generating encoding information, the image may be converted into a token sequence so that encoding information may be generated.

The method of generating text from an image according to the present disclosure may further include operation S300 of generating image-text synthetic data for the image by combining image and text information.

The method of generating text from an image according to the present disclosure may further include an operation S440 of generating an image based on text using the image-text synthetic data.

In operation S140, a pretrained encoder-decoder model and the processor may convert the image into an image token sequence in cooperation with each other using codebook indices of the encoder-decoder model. Here, the encoding information for the image may include the codebook indices and/or the image token sequence.

A pretrained image-to-text back-translation model and the processor may perform operation S240 in cooperation with each other. The image-to-text back translation model may be a transformer neural network model, which may extract natural language text highly associated with the encoding information (image token sequence) of the image based on attention between the encoding information for the image and natural language text.

A pretrained text-based image generation model and the processor may perform operation S440 in cooperation with each other. The text-based image generation model may be a model trained based on the image-text synthetic data generated in operation S300.

Figure 3:
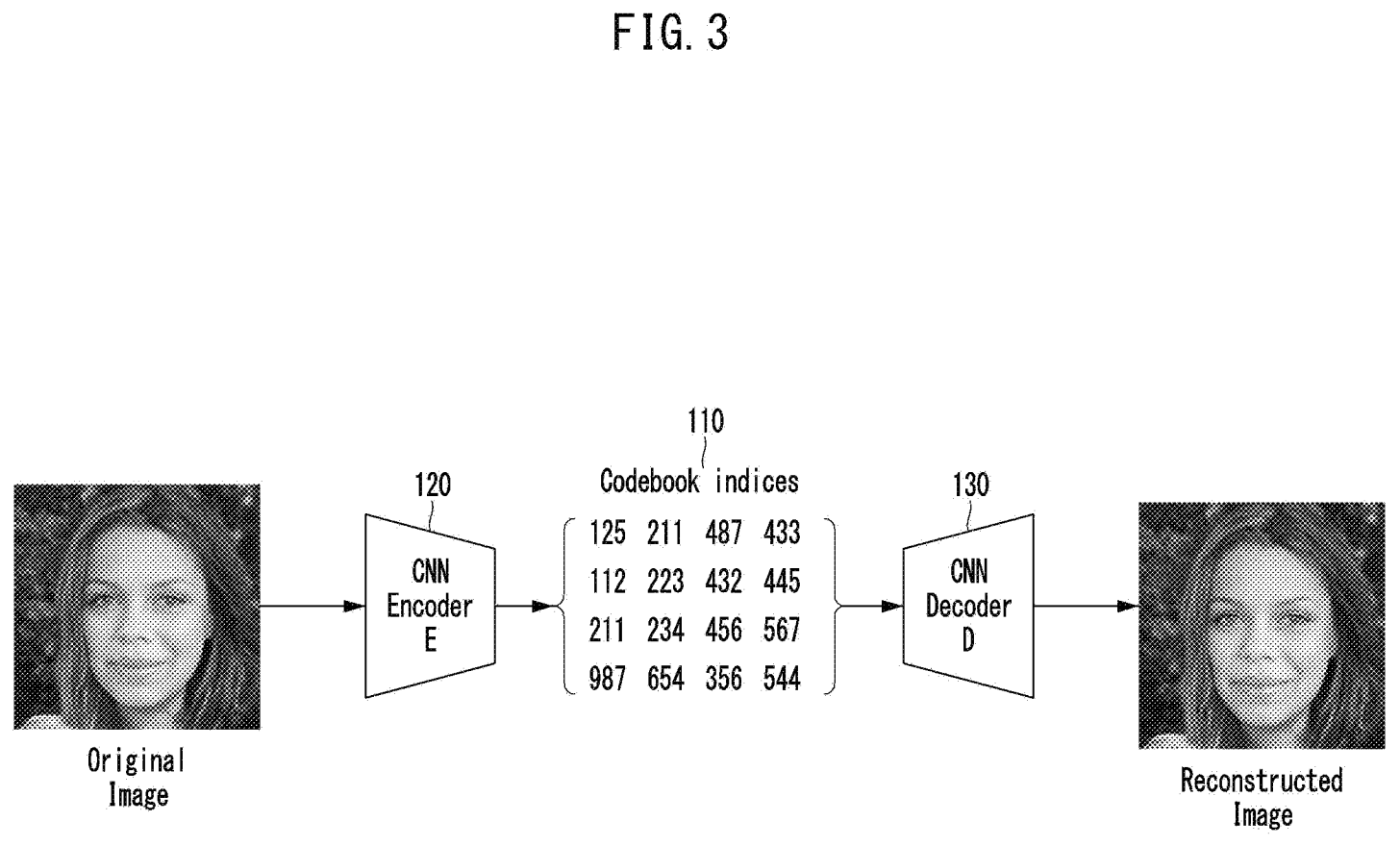

FIG. 3 is a conceptual diagram illustrating an image codebook learning process according to an exemplary embodiment of the present disclosure. Referring to FIG. 3, image tokens expressing an image in block units are conceptually shown.

A process in which an image is compressed (encoded) by an encoder 120, subjected to a specific channel (broadcast, communicated, or stored and then read), and then restored (decoded) by a decoder 130 is simulated and learned in an end-to-end manner. Here, a result of encoding by the encoder 120 may be referred to as a codebook, and encoding information for the image obtained through repeated training may be given as codebook indices 110.

An encoder-decoder model according to an exemplary embodiment of the present disclosure may encode an image, and for that purpose, may generate a codebook for encoding the image. The codebook may be provided in the form of the quantized codebook indices 110 through the learning process.

In the codebook generation process, the encoder 120 for coding a quantized codebook and an image and the decoder 130 for reconstructing the image from the code may be trained together. This may be referred to as end-to-end learning.

When a learning procedure of a generative adversarial network (GAN) manner is used together with a patch-based discriminator, it is possible to obtain good performance in terms of picture quality without degradation even while increasing the size of blocks. An objective function for finding an optimal compression model Q* is Equation 1 below.

$$Q^* = \qquad\qquad\qquad\qquad\qquad\qquad\qquad \text{[Equation 1]}$$
$$\underset{E,G,Z}{\arg\min}\ \underset{D}{\max}\ E_{x\sim p(x)}[L_{VQ}\ (E,\ G,\ Z) + \lambda L_{GAN}\ (\{E,\ G,\ Z\},\ D)]$$

E is an encoder, G is a decoder, Z is a codebook, and D is a discriminator. $L_{VQ}$ is a loss function related to codebook learning which is set so that loss is reduced when an image is reconstructed in an encoding and decoding process, and $L_{GAN}$ is a loss function of a GAN manner which prevents an image generated using a codebook from differing from the original image in terms of picture quality. Training may be performed to reduce the sum of the two loss functions.

$\lambda$ is a ratio of the instantaneous rate of change of $L_{VQ}$ to the instantaneous rate of change of $L_{GAN}$ and may be calculated according to Equation 2 below.

$$\lambda = \frac{\nabla_{G_L}[L_{VQ}]}{\nabla_{G_L}[L_{GAN}] + \delta} \qquad\qquad \text{[Equation 2]}$$

$\nabla_{G_L}[\cdot]$ is a differential coefficient of the final layer of the decoder 130, and $\delta$ is a constant.

Figures 4, 5:
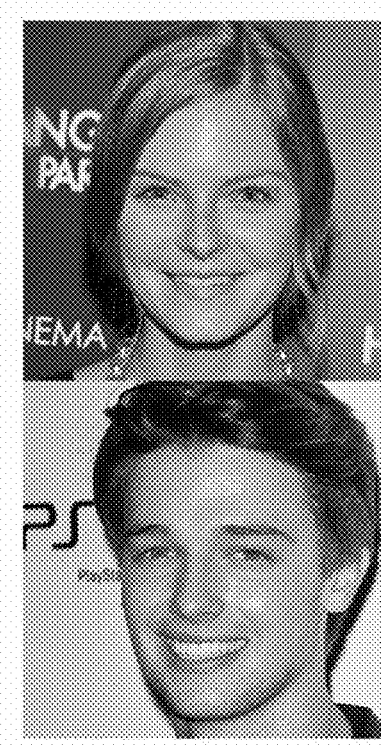
FIG. 4 is a conceptual diagram showing a structure of a text/image pair dataset according to an example embodiment of the present disclosure.
FIG. 5 is a set of examples of a text/image pair dataset according to an example embodiment of the present disclosure.

FIG. 4 is a conceptual diagram showing a structure of a text/image pair dataset according to an example embodiment of the present disclosure.

When codebook learning is completed, text/image pair data to be used in learning may be prepared, an image may be converted into a continuous form of the quantized codebook indices (word) 110, and text/image token sequence pair data may be generated. A structure of a text/image pair dataset is as follows. Text describing the image may be inserted behind a <|startofimg|> tag, and consecutive image tokens may be inserted behind an <img|> tag. Finally, an <|endofimg|> tag may be inserted to represent the end of the dataset.

FIG. 5 is a set of examples of a text/image pair dataset according to an example embodiment of the present disclosure.

Referring to FIG. 5, text/image pair datasets of face images are prepared. FIG. 5 shows some examples of the Multi-Modal CelebA-HQ Dataset which is a text/image pair dataset. The Multi-Modal CelebA-HQ Dataset is an open dataset and may provide text information of CelebA-HQ which is a dataset of 30,000 face images of celebrities.

There may be 10 pieces of text information for one image. FIG. 5 shows a text/image pair dataset that may be used in an example embodiment of the present disclosure, and the spirit of the present disclosure is not limited to the embodiment.

Figures 6, 7:
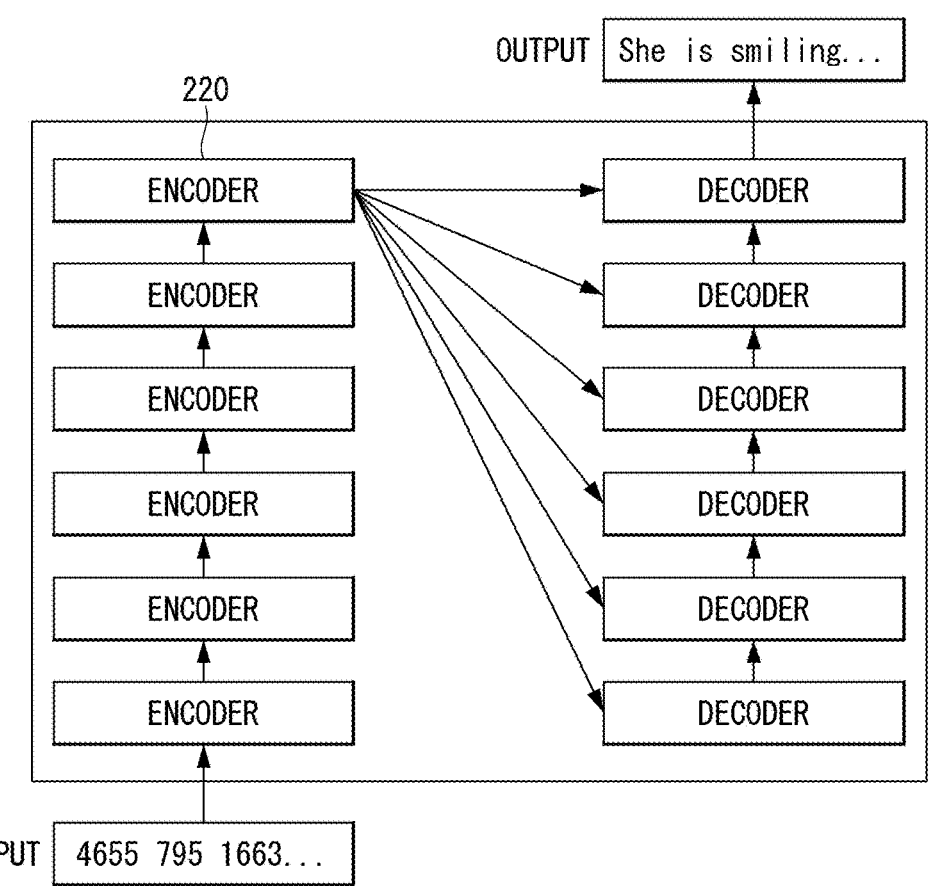
FIG. 6 shows text/image token sequence pair data according to an example embodiment of the present disclosure.
FIG. 7 is a conceptual diagram illustrating an operation of an image-to-text translation model employing a transformer neural network structure according to an example embodiment of the present disclosure.

FIG. 6 shows text/image token sequence pair data according to an example embodiment of the present disclosure.

Referring to FIG. 6, when blocks have a size of 16 horizontal pixels by 16 vertical pixels and each block is represented as one codebook index, a 256×256 pixel image may be represented as 256 consecutive image tokens.

For example, CelebA-HQ includes 30,000 images, and Multi-Modal CelebA-HQ Dataset includes 10 pieces of text information per image. Accordingly, text/image token sequence pair datasets may be 300,000 in total.

FIG. 7 is a conceptual diagram illustrating an operation of an image-to-text translation model employing a transformer neural network structure according to an example embodiment of the present disclosure.

Referring to FIG. 7, an image-to-text translation (back-translation) model 220 used in operation S200 of FIG. 1 and/or operation S240 of FIG. 2 is illustrated.

The back-translation model 220 for converting an image into text is trained using token sequence pair data. The back-translation model 220 is a typical encoder-decoder model and may be a transformer model including six encoders and six decoders.

Here, the encoders and decoders of the back-translation model 220 based on a transformer neural network are slightly different from the encoder and decoder of FIG. 3 and may have 16 attention heads.

In operation S200, the back-translation model 220 of FIG. 7 may learn a function of extracting attention between an image token sequence given as an input and natural language text.

In operation S240, the back-translation model 220 of FIG. 7 may convert an input of an image token sequence into text.

The input sequence (image token sequence) may be input to a first encoder layer and may be converted into one vector by repeatedly passing through several encoder layers. The converted vector may be converted into an output sequence (text) by passing through several decoding layers. The encoder layers have the same structure but different parameter values. One encoder layer may include a self-attention neural network and a feed-forward neural network. Self-attention is an operation of calculating attention scores between words in a sentence and learning information on which word each word is highly associated with. Neural networks may be configured to learn context information of the input sentence through attention.

An output of the final encoder layer may be transmitted to the decoders. The decoders may include several decoder layers, and an output value of the final layer may be output words as a final translation result. One decoder layer may include a self-attention neural network, an encoder-decoder attention neural network layer, and a feed-forward neural network layer. Like in the encoders, self-attention in the decoders may be used for calculating weights indicating a degree of association between words. Encoder-decoder attention may be an operation of calculating information on decoded words and input words through attention to calculate which word in the input sentence is associated with each word being output.

After training of the back-translation model 220 employing a transformer architecture is completed, an image-only dataset may be prepared. When image tokens are input to the back-translation model 220, text is output. Accordingly, the image dataset may be converted into an image token sequence to be used as an input to the back-translation model 220 (S140).

When the corresponding image data is converted into an image token sequence and then input to the pretrained image-to-text back-translation model 220, text data describing the image may be obtained as an output (S240). Therefore, when an image-only dataset without text is input, text about the dataset may be generated, and a synthetic dataset of a text/image pair may be generated.

For example, a Korean face image dataset may be collected from a web or an SNS. Although there is no text data for the image dataset, the back-translation model 220 may be used for synthesizing corresponding text data with the Korean face image data.

Korean face text/image token pair data which is generated through this synthesis may be used for training a text-based Korean face image generation model. When an image is encoded using a codebook, a text-based image generation mechanism may be considered the same as a next word prediction mechanism in the field of natural language processing.

Among recent deep learning language models, a generative pretrained transformer (GPT) is showing good performance in the field of sentence generation through prediction of a next word (token). A GPT is a model employing a decoder part of a transformer structure. A GPT is trained to estimate a probability that a word will appear subsequent to given words in a sentence from the given words. In other words, when a previous index $x_{x_i}$ is given, a GPT learns a probability distribution $p(x_i|x<i)$ in a self-supervised learning manner to estimate a next index $x_i$.

Here, the probability distribution may be expressed according to Equation 3 below.

$$p(x) = \prod_{i=1}^{n} p(x_i \mid x_i, \ldots, x_{i-1}; \theta) \qquad \text{[Equation 3]}$$

Here, $\theta$ is a parameter of the transformer, and a next token may be estimated through the final SoftMax layer. A sentence may be generated in an autoregressive manner in which, when a token is generated, the generated token is used as an input to generate the subsequent token.

An example embodiment of the present disclosure relates to a virtual text/image synthetic data generation method and may provide a method of virtually generating a text data pair describing image-only data using text/image pair data of a similar domain to the image-only data.

Deep learning technology is developing rapidly and being applied to many fields. The deep learning technology shows excellent performance but requires a large amount of data to implement deep learning. In general, when the amount of data increases, a deep learning model shows better performance.

With the widespread application of the deep learning technology, the significance of data is emerging. However, because data collection requires much time and high cost, many companies are having difficulties. In particular, it is very difficult to collect text/image pair data which is necessary for text-based image generation, and thus a technology for automatically generating text/image pair data from an image-only dataset without any text or label is expected to be very useful.

According to an example embodiment of the present disclosure, it is possible to implement an apparatus and method for generating natural language text describing an image based on image-only data without any label.

According to an example embodiment of the present disclosure, it is possible to reduce the load of a process of generating natural language text describing an image.

According to an example embodiment of the present disclosure, it is possible to generate natural language text describing not only objects which are detectable in an image but also the image itself.

According to an example embodiment of the present disclosure, it is possible to reduce a training time of a model for generating natural language text describing an image.

The present disclosure proposes a text/image synthetic data generation method in which the back-translation model 220 is generated based on text/image pair data of a similar domain to image-only data and text data describing image-only data is generated using the back-translation model 220.

According to an image-text synthetic data generation technology of the present disclosure, it is possible to synthesize text/image pair data using an image-only dataset, and in this way, massive image-text pair data can be generated at a low cost and used for text-based image generation.

The present disclosure may correspond to a process of synthesizing text/image pair data when text/image pair data used for text-based image generation is determined to be virtual data rather than actual data.

FIG. 8 shows a set of images generated from text as application examples of a process of generating text from an image according to an example embodiment of the present disclosure.

When text information of an image to be generated is input to a pretrained GPT model in the form of <|startofimg|>[text]<|img|>, the model may estimate and generate [consecutive image tokens]<|endofimg|> as a remaining part.

According to a method of estimating a subsequent image token, a word with the highest probability value output from a SoftMax layer may be selected, and a top-k sampling method of selecting K candidates with high probabilities and then sampling the selected K candidates and the like may be used. When image tokens generated as described above are decoded based on a codebook, an image may be generated. The generated image is an image corresponding to the text input. FIG. 8 shows pairs of text information and a Korean face image generated from the corresponding text.

As described above, it is possible to generate an image-text synthetic dataset for image-only data without text information using the proposed method, and a text-based image generation model can be trained based on the image-text synthetic dataset.

A process of generating or extracting text from an image according to an example embodiment of the present disclosure may have the following differences from a technology for describing an object-based feature map in a natural language according to the related art.

According to an example embodiment of the present disclosure, it is possible to learn a natural language text generation/extraction/translation function using a codebook/image token sequence having a shorter length than an object-based feature map of the related art. Since the length of data required for learning is short, it is possible to learn the data in a short time.

In general, in the case of learning a natural language translation function using a transformer neural network, it is known that time complexity is proportional to the square of the length of data. Accordingly, reducing the length of data can be a major benefit.

For example, an object-based feature map generally has a size of $1,024*1,024$ or $n*1,024$, whereas an example in which an image token sequence is implemented with a length of 256 according to an example embodiment of the present disclosure is shown in FIG. 6.

The image-to-text back-translation model 220 may theoretically have a long short-term memory (LSTM) or transformer neural network structure. However, since an LSTM sequentially processes input sequence data, parallel computation processing is not possible, and it is difficult to process a long sequence. A transformer neural network model shows excellent translation performance. This is because a model learning time can be remarkably reduced due to possible parallel computation processing and dependency between input and output words may be modeled regardless of distance.

Also, when a transformer neural network model is combined with an image token sequence configuration of the present disclosure, great synergy is generated. Since parallel processing is possible and a learning time can be reduced, the number of datasets that can be learned can remarkably increase, and also performance of the model can be improved.

In particular, an image token sequence is compressed information, and thus the load of a natural language translation process can be reduced. Also, an image token sequence is standardized block-based information, and thus a natural language description of an image can be generated without any omission.

When an object-based feature map of the related art is translated into a natural language, only objects that are detectable by an object detector can be targets of translation or description. On the other hand, according to an example embodiment of the present disclosure, standardized block-based information is used, and thus features of an image are not limited to only objects and can be extensively interpreted.

Here, the relative positional relationship between tokens is not included in codebook information. However, when an image is encoded in a specific order by the encoder 120, the relative positional information between tokens may be construed as having been taken into consideration already.

Figure 9:
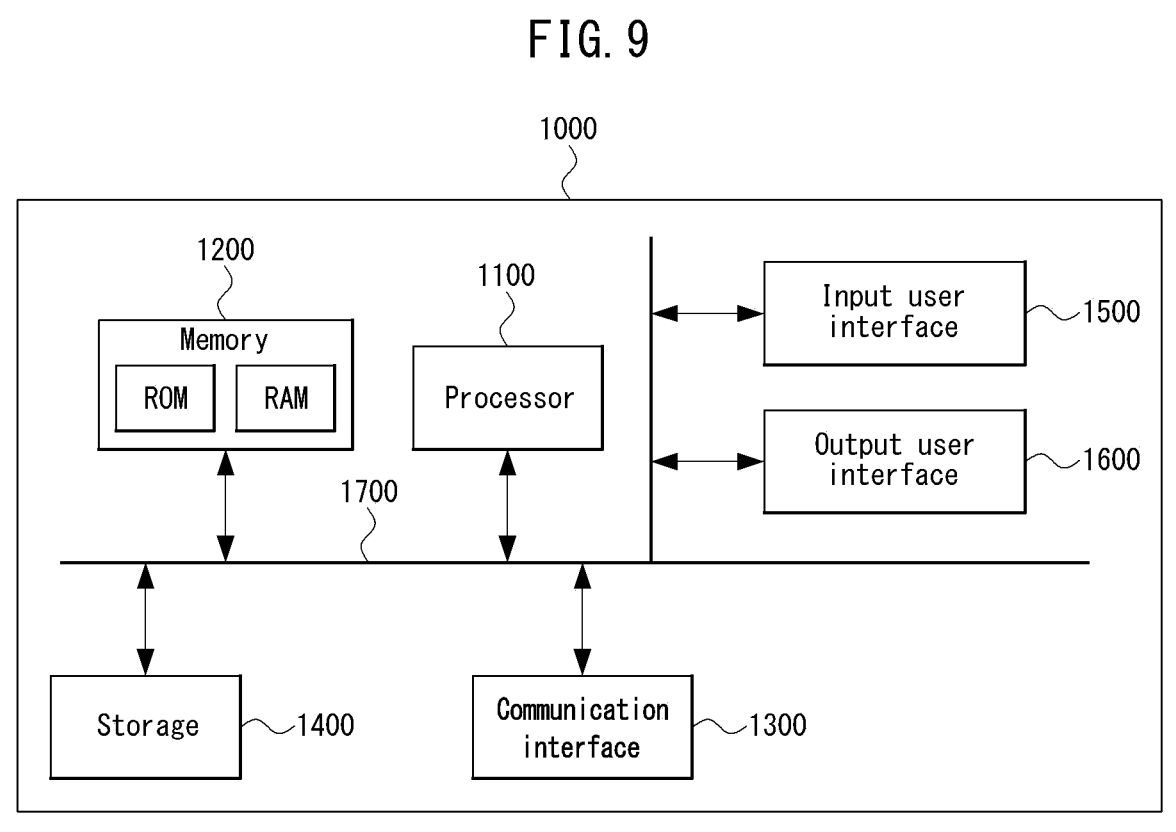

FIG. 9 is a block diagram showing an example of a generalized dynamic workload processing device, dynamic workload processing system, or computing system for performing at least some of the processes of FIGS. 1 to 8.

At least a partial process of a dynamic workload processing method according to an example embodiment of the present disclosure may be performed by a computing system 1000 of FIG. 9.

Referring to FIG. 9, the computing system 1000 according to the example embodiment of the present disclosure may include a processor 1100, a memory 1200, a communication interface 1300, a storage 1400, an input interface 1500, an output interface 1600, and a bus 1700.

The computing system 1000 according to the example embodiment of the present disclosure may include the at least one processor 1100 and the memory 1200 in which instructions for the processor 1100 to perform at least one operation are stored. At least some operations of a method according to an example embodiment of the present disclosure may be performed by the at least one processor 1100 loading instructions from the memory 1200 and executing the instructions.

The processor 1100 may be a central processing unit (CPU), a graphics processing unit (GPU), or a dedicated processor for performing methods according to example embodiments of the present disclosure.

Each of the memory 1200 and the storage 1400 may be configured using at least one of a volatile storage medium and a non-volatile storage medium. For example, the memory 1200 may be configured using at least one of a read-only memory (ROM) and a random-access memory (RAM).

The computing system 1000 may include the communication interface 1300 that performs communication through a wireless network.

Also, the computing system 1000 may further include the storage 1400, the input interface 1500, the output interface 1600, and the like.

The elements included in the computing system 1000 may be connected through the bus 1700 and communicate with each other.

Examples of the computing system 1000 of the present disclosure may be a desktop computer, a laptop computer, a notebook, a smart phone, a tablet personal computer (PC), a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), and the like which can perform communication.

An apparatus for generating text from an image according to an example embodiment of the present disclosure includes the memory 1200 for storing at least one instruction and the processor 1100 for executing at least one instruction. The processor 1100 generates encoding information for an image based on the image by executing at least one instruction and extracts text information related to the content of the image based on the degree of association with the encoding information.

The processor 1100 may extract the text information by translating the encoding information in cooperation with the image-to-text translation model 220.

In cooperation with the image-to-text translation model 220, the processor 1100 may extract, as text information, text having high attention with the encoding information as the degree of association with the encoding information.

The processor 1100 may generate the encoding information using codebook indices for encoding the image in cooperation with the pretrained encoder-decoder model.

The processor 1100 may generate the encoding information by converting the image into an image token sequence using the codebook indices.

The processor 1100 may generate image-text synthetic data for the image by combining the image and the text information.

The processor 1100 may generate an image based on the text using the image-text synthetic data. This process may be performed by the processor 1100 cooperating with a text-based image generation model which is pretrained using an image-text synthetic dataset.

The encoder-decoder model may be defined by a parameter set stored in the memory 1200 and/or the storage 1400.

The image-to-text translation model 220 may also be defined by the parameter set stored in the memory 1200 and/or the storage 1400.

The text-based image generation model may also be defined by the parameter set stored in the memory 1200 and/or the storage 1400.

Neural network models according to example embodiments of the present disclosure may be defined by the parameter set stored in the memory 1200 and/or the storage 1400 which may electronically communicate with the processor and may perform tasks assigned to the models in cooperation with the processor 1100.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

According to example embodiments of the present disclosure, it is possible to reduce the load of a process of generating natural language text describing an image.

According to example embodiments of the present disclosure, it is possible to generate natural language text describing not only objects which are detectable in an image but also the image itself.

According to example embodiments of the present disclosure, it is possible to reduce a training time of a model for generating natural language text describing an image.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An apparatus for generating text from an image, the apparatus comprising:
    a memory configured to store at least one instruction; and
    a processor configured to execute the at least one instruction,
    wherein the processor is further configured to:
        convert the image into an image token sequence using a learned codebook;
        generate encoding information comprising the image token sequence; and
        generate text information describing semantic content of the image by applying an image-to-text translation model that receives the encoding information as an input sequence, and
        wherein the image-to-text translation model is configured to generate the text information based on learned degrees of association between image tokens in the encoding information and text tokens.

2. The apparatus of claim 1, wherein each token of the image token sequence corresponds to a unit block of the image, the unit block having a size of N pixels×M pixels, N and M being positive integers greater than one.

3. The apparatus of claim 2, wherein N and M are equivalent.

4. The apparatus of claim 1, wherein the image-to-text translation model comprises a transformer-based encoder-decoder architecture configured to generate the text information based on the learned degrees of association between the image tokens and the text tokens.

5. The apparatus of claim 4, wherein
    at least one encoder layer of the transformer-based encoder-decoder architecture comprises a self-attention neural network layer and a feed-forward neural network layer, and
    at least one decoder layer of the transformer-based encoder-decoder architecture comprises a self-attention neural network layer, an encoder-decoder attention neural network layer, and a feed-forward neural network layer.

6. The apparatus of claim 1, wherein the processor is further configured to generate image-text synthetic data for the image by combining the image and the text information.

7. The apparatus of claim 6, wherein the processor is further configured to generate an image based on the text using the image-text synthetic data.

8. A method of generating text from an image performed by a processor executing at least one instruction stored in a memory, the method comprising:
    converting the image into an image token sequence using a learned codebook;
    generating encoding information comprising the image token sequence; and
    generating text information describing semantic content of the image by applying an image-to-text translation model that receives the encoding information as an input sequence,
    wherein the image-to-text translation model is configured to generate the text information based on learned degrees of association between image tokens in the encoding information and text tokens.

9. The method of claim 8, wherein each token of the image token sequence corresponds to a unit block of the image, the unit block having a size of N pixels×M pixels, N and M being positive integers greater than one.

10. The method of claim 9, wherein N and M are equivalent.

11. The method of claim 8, wherein the image-to-text translation model comprises a transformer-based encoder-decoder architecture configured to generate the text information based on the learned degrees of association between the image tokens and the text tokens.

12. The method of claim 11, wherein
    at least one encoder layer of the transformer-based encoder-decoder architecture comprises a self-attention neural network layer and a feed-forward neural network layer, and
    at least one decoder layer of the transformer-based encoder-decoder architecture comprises a self-attention neural network layer, an encoder-decoder attention neural network layer, and a feed-forward neural network layer.

13. The method of claim 8, further comprising combining the image and the text information to generate image-text synthetic data for the image.

14. The method of claim 13, further comprising generating an image based on the text using the image-text synthetic data.

15. A method of training an image-to-text translation model for generating text describing semantic content of an image, performed by a processor executing at least one instruction stored in a memory, the method comprising:
    converting an image into an image token sequence using a learned codebook;
    generating encoding information comprising the image token sequence; and
    training the image-to-text translation model to learn a function for generating text information describing semantic content of the image using the encoding information as an input sequence,
    wherein the function enables the image-to-text translation model to generate the text information based on learned degrees of association between image tokens in the encoding information and text tokens.

16. The method of claim 15, wherein each token of the image token sequence corresponds to a unit block of the image, the unit block having a size of N pixels×M pixels, N and M being positive integers greater than one.

17. The method of claim 15, further comprising:

inputting a training image to an encoder-decoder model; and training the encoder-decoder model to learn a function for generating the learned codebook from the training image.

18. The method of claim 15, wherein the image-to-text translation model comprises a transformer-based encoder-decoder architecture configured to generate, using the function, the text information based on the learned degrees of association between the image tokens and the text tokens.

19. The method of claim 15, further comprising combining the image and the text information to generate image-text synthetic data for the image.

20. The method of claim 19, further comprising training a text-based image generation model to learn a function for generating an image based on text using the image-text synthetic data.

* * * * *